(12) United States Patent
Park (10) Patent No.: US 9,885,589 B2
(45) Date of Patent: Feb. 6, 2018

(54) WHEEL CIRCUIT USING ELECTROMAGNETIC INDUCTION AND ELECTRONIC PEN INCLUDING THE SAME

(71) Applicant: Samsung Electronics Co., Ltd., Suwon-si, Gyeonggi-do (KR)

(72) Inventor: Sung Chul Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 687 days.

(21) Appl. No.: 14/497,935

(22) Filed: Sep. 26, 2014

(65) Prior Publication Data

US 2015/0123681 A1  May 7, 2015

(30) Foreign Application Priority Data

Nov. 7, 2013  (KR) .......................... 10-2013-0135027

(51) Int. Cl.
*G01D 5/20* (2006.01)
*G06F 3/03* (2006.01)
*G06F 3/0362* (2013.01)
*G06F 3/0354* (2013.01)

(52) U.S. Cl.
CPC ............. *G01D 5/20* (2013.01); *G06F 3/0312* (2013.01); *G06F 3/0362* (2013.01); *G06F 3/03545* (2013.01)

(58) Field of Classification Search
CPC ........ G01D 5/20; G01D 11/00; G06F 1/1626; G06F 3/162; G01R 29/0878; G01R 31/06

USPC ........ 324/600, 652, 655, 332–346, 629–633, 324/637–646, 668, 675, 682, 708
See application file for complete search history.

(56) References Cited

U.S. PATENT DOCUMENTS

| | | | |
|---|---|---|---|
| 5,969,296 A * | 10/1999 | Yamamoto | G06F 3/03545 178/18.01 |
| 6,576,850 B2 | 6/2003 | Fukushima et al. | |
| 2001/0050556 A1 | 12/2001 | Fukushima et al. | |
| 2011/0006759 A1* | 1/2011 | Fukushima | G06F 3/046 324/207.15 |
| 2012/0068975 A1 | 3/2012 | Wei et al. | |

FOREIGN PATENT DOCUMENTS

GB  862870 A  3/1961

* cited by examiner

*Primary Examiner* — Melissa Koval
*Assistant Examiner* — Trung Nguyen
(74) *Attorney, Agent, or Firm* — Jefferson IP Law, LLP (57) ABSTRACT

A wheel circuit using electromagnetic induction and an electronic pen are provided. The wheel circuit includes a rotary encoder configured to be rotated according to a user operation and includes at least one port, a resonant unit configured to be coupled with a port of the at least one port, and at least one capacitor including one end which is coupled with at least one other port which is not coupled with the resonant unit among the at least one port. The at least one capacitor has a capacitance different from each other, wherein at least one other capacitor of the at least one capacitor is connected to the resonant unit according to rotation of the rotary encoder to vary a resonant frequency.

24 Claims, 10 Drawing Sheets

WHEEL CIRCUIT USING ELECTROMAGNETIC INDUCTION AND ELECTRONIC PEN INCLUDING THE SAME

CROSS-REFERENCE TO RELATED APPLICATION(S)

This application claims the benefit under 35 U.S.C. §119 (a) of a Korean patent application filed on Nov. 7, 2013 in the Korean Intellectual Property Office and assigned Serial number 10-2013-0135027, the entire disclosure of which is hereby incorporated by reference.

TECHNICAL FIELD

The present disclosure relates to a wheel circuit using electromagnetic induction and an electronic pen including the same. More particularly, the present disclosure relates to a wheel circuit using electromagnetic induction which varies a resonant frequency of a resonant circuit by connecting a certain reactance device to the resonant circuit by rotation of a rotating unit and enables an electronic device to detect an operation state of a wheel by detecting variation in a resonant frequency, and an electronic pen including the same.

BACKGROUND

A recent portable device has composite functions, such as photographing of photos or moving pictures, playback of music or moving picture files, game play, broadcasting reception service, support of a wireless Internet, and the like, and is implemented as an integrated multimedia player. Accordingly, the portable device has been developed to a new form in a hardware or software side in order to reinforce portability and convenience while satisfying a user's needs.

One of functions applied to the portable device is a function to control the portable device by using an electronic pen. An electronic pen of the related art is implemented to control the portable device by generating a touch or proximity input in the portable device or to control the portable device by operating a button included in the electronic pen.

However, a need for operation of the portable device according to various operations of the electronic pen has increased. Accordingly, a technical research and study to mount a wheel on the electronic pen has been carried out.

Figure 1:
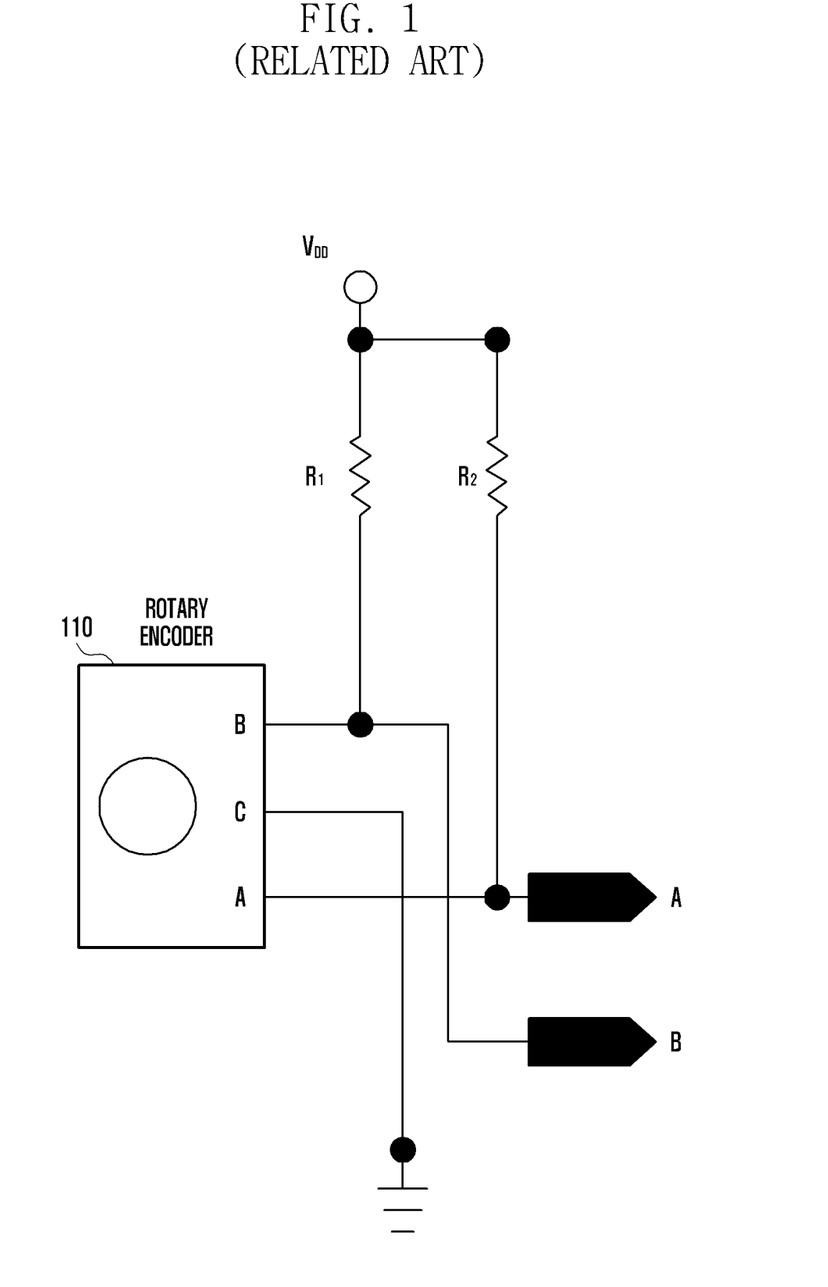
FIG. 1 is a circuitry diagram illustrating a configuration of a wheel circuit according to the related art.

FIG. 1 is a circuitry diagram illustrating a configuration of a wheel circuit according to the related art.

Referring to FIG. 1, the wheel circuit according to the related art includes a switch where connection between ports is changed due to movement of an input unit. The switch may include a rotary encoder 110.

The rotary encoder includes three ports, that is, ports A, B, and C. As the rotary encoder is rotated, the port A can be electrically connected to the port B, or the port A can be electrically connected to the port C, or the port B can be electrically connected to the port C.

The port A and the port B are connected to two resistors R1 and R2 which have different resistance values, respectively, and the port C is grounded.

Figure 2A:
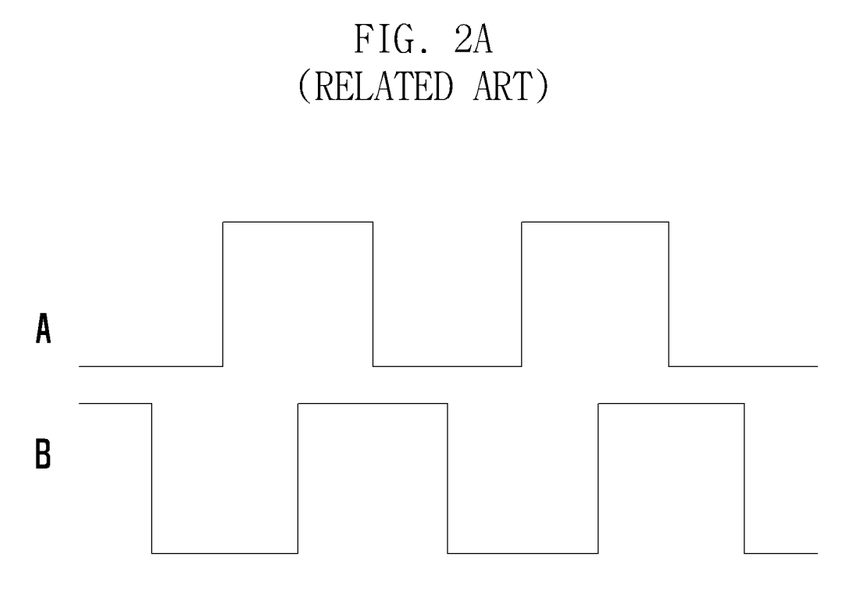
FIGS. 2A and 2B illustrate variation of in signal output from a port A and a port B as a rotary encoder is rotated in a wheel circuit according to the related art.
Figure 2B:
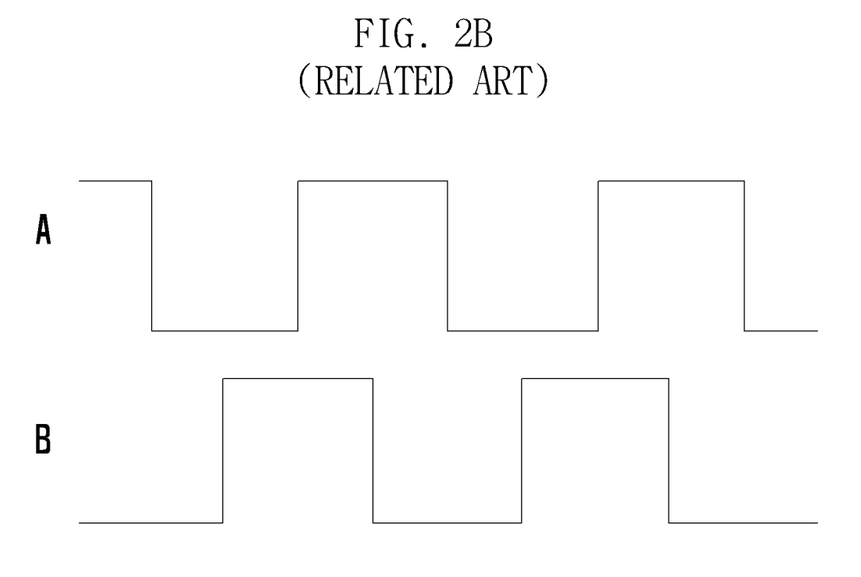

FIGS. 2A and 2B illustrate variation of signal output from port A and port B as a rotary encoder is rotated in a wheel circuit according to the related art.

Referring to FIG. 2A, it illustrates variation of signal output from the port A and the port B when the rotary encoder is rotated clockwise.

Referring to FIG. 2B, it illustrates variation of signal output from the port A and the port B when the rotary encoder is rotated counterclockwise.

The rotary encoder is rotated to change the electrically connected ports when power is applied to resistors R1 and R2. The electronic device including a wheel according to the related art may detect an operation state of the wheel based on output signal shown in FIGS. 2A and 2B.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems, and/or disadvantages and to provide at least the advantages described below. Accordingly, an aspect of the present disclosure is to provide a wheel circuit using electromagnetic induction and an electronic pen including the same.

Another aspect of the present disclosure is to provide a wheel circuit using electromagnetic induction which varies a resonant frequency of a resonant circuit by connecting a certain reactance device to the resonant circuit by movement of an input unit and enables an electronic device to detect an operation state of a wheel by detecting variation of a resonant frequency and an electronic pen including the same.

In accordance with an aspect of the present disclosure, a wheel circuit using electromagnetic induction is provided. The wheel circuit includes a rotary encoder configured to be rotated according to a user operation and includes at least one port, a resonant unit configured to be coupled with a port of the at least one port, and at least one capacitor including one end which is coupled with at least one other port which is not coupled with the resonant unit among the at least one port, wherein the at least one capacitor has a capacitance different from each other, and wherein at least one other capacitor of the at least one capacitor is connected to the resonant unit according to rotation of the rotary encoder to vary a resonant frequency.

The resonant frequency varies according to capacitance of a capacitor connected to the resonant unit, so that at least one electronic device detects an operation state of a wheel due to electromagnetic induction by the variation of the resonant frequency. The at least one capacitor includes a first capacitor connected to a first port of the rotary encoder and a second capacitor connected to a second port of the rotary encoder, wherein the resonant frequency is changed to a first resonant frequency when the first capacitor is connected to the resonant unit, the resonant frequency is changed to a second resonant frequency when the second capacitor is connected to the resonant unit, and the resonant frequency is changed to a third resonant frequency when both of the first capacitor and the second capacitor are connected to the resonant unit. The resonant frequency is sequentially changed in a rotation direction of the rotary encoder. The resonant unit includes at least one of an inductor and a capacitor. The wheel circuit using electromagnetic induction further includes a switch having one end connected to the resonant unit and the other end connected to the rotary encoder. The switch is turned-on/off to vary the resonant frequency. The rotary switch is implemented not to block connection of the at least one capacitor of the at least one capacitor with the resonant unit while the rotary switch is rotated.

In accordance with another aspect of the present disclosure, an electronic pen comprising a wheel circuit using electromagnetic induction is provided. The electronic pen includes a rotary encoder configured to be rotated according to a user operation and includes at least one port, a resonant unit configured to be coupled with a port of the at least one port, and at least one capacitor including one end which is coupled with at least one other port which is not coupled with the resonant unit among the at least one port, wherein the at least one capacitor has a capacitance different from each other, and wherein at least one other capacitor of the at least one capacitor is connected to the resonant unit according to rotation of the rotary encoder to vary a resonant frequency.

The resonant frequency varies according to capacitance of a capacitor connected to the resonant unit, so that at least one electronic device detects an operation state of a wheel due to electromagnetic induction by the variation of the resonant frequency. The at least one capacitor includes a first capacitor connected to a first port of the rotary encoder and a second capacitor connected to a second port of the rotary encoder, wherein the resonant frequency is changed to a first resonant frequency when the first capacitor is connected to the resonant unit, the resonant frequency is changed to a second resonant frequency when the second capacitor is connected to the resonant unit, and the resonant frequency is changed to a third resonant frequency when both of the first capacitor and the second capacitor are connected to the resonant unit. The resonant frequency is sequentially changed in a rotation direction of the rotary encoder. The resonant unit comprises at least one of an inductor and a capacitor.

The electronic further includes a switch having one end connected to the resonant unit and the other end connected to the rotary encoder. The switch is turned-on/off according to a user operation, and is turned-on/off to vary the resonant frequency. The rotary switch is implemented not to block connection of the at least one capacitor of the at least one capacitor with the resonant unit while the rotary switch is rotated. The electronic pen further includes a pen tip provided at one end of the electronic pen to vary the resonant frequency according to a strength of an external force, and a variation amount of resonant frequency due to rotation of the rotary switch is greater than a variation amount of resonant frequency by the pen tip.

In accordance with another aspect of the present disclosure, a circuit is provided. The circuit includes a first switch configured to be equipped with a plurality of ports, and change a connection between ports by movement of an input unit, at least one resonant unit configured to be connected to the plurality of ports, and at least one reactance device configured to be connected to the plurality of ports.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The present disclosure is applicable to an electronic device controlled according to an operation of an electronic pen including a wheel circuit or an operation of a wheel.

A wheel according to the present disclosure may be applicable to various electronic devices including a wheel as well as general electronic devices, such as a Smart Phone, a Portable Terminal, a Mobile Terminal, a Personal Digital Assistant (PDA), a Portable Multimedia Player (PMP) terminal, a Note Pad, a Wibro terminal, a Tablet PC, a camera, and the like.

Figure 3:
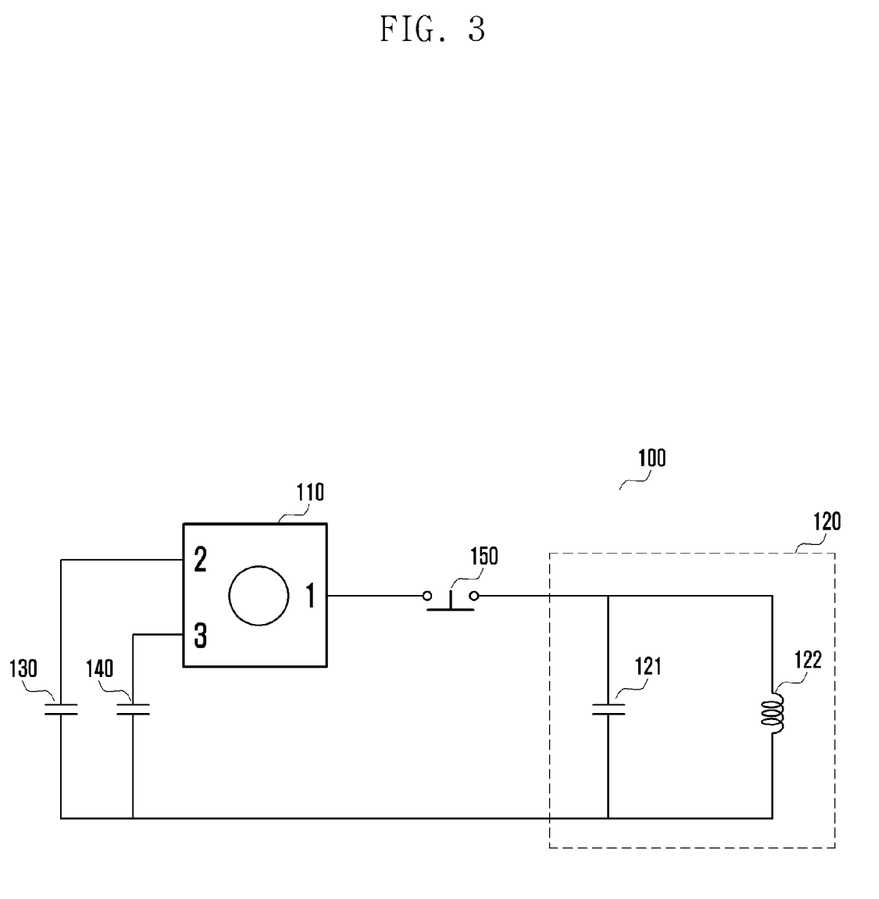
FIG. 3 is a circuitry diagram illustrating a wheel circuit according to an embodiment of the present disclosure.

FIG. 3 is a circuitry diagram illustrating a wheel circuit according to an embodiment of the present disclosure.

Referring to FIG. 3, a wheel circuit 100 includes the rotary encoder 110.

The rotary encoder 110 may be rotated according to an operation of a user. The rotary encoder 110 may include a handle and a jog dial for rotation operation. For example, the rotary encoder 110 performs a function of a wheel in the wheel circuit 100. The rotary encoder 110 may include at least one port. In various embodiments of the present disclosure, it is assumed that the rotary encoder 110 includes three ports 1, 2, and 3. The rotary encoder 110 electrically connects two of the three ports to each other according to a rotation state. For example, the rotary encoder 110 electrically connects the port 1 to the port 2 according to the rotation state. The rotary encoder 110 electrically connects the port 1 to the port 3 according to the rotation state. The rotary encoder 110 may electrically connect the port 1 to both of the port 2 and the port 3 according to the rotation state.

A resonant unit 120 is connected to a certain port of the rotary encoder 110. It is assumed that the resonant unit 120 is connected to the port 1 of the rotary encoder 110.

The resonant unit 120 may include at least one inductor (or, a coil) 122. The inductor 122 forms an LC circuit with at least one reactance device 130 or 140 included in the wheel circuit 100. The resonant unit 120 generates electromagnetic induction by using a resonant frequency of the LC circuit as will be described below.

According to implementation type, the resonant unit 120 may include at least one reactance device 121. In this case, the reactance device 121 may be connected to the resonant unit 120 in parallel. In this case, the at least one reactance device 121 included in the resonant unit 120 configures the above LC circuit. When all connection of the resonant unit 120 with the at least one reactance device 130 or 140 connected to the rotary encoder 110 is blocked, the reactance device 121 enables the resonant unit 120 to serve as the LC circuit. In this case, a resonant frequency of the LC circuit configured by only the resonant unit 120 is F0.

At least one reactance device 130 or 140 is connected to other ports of the rotary encoder 110. For example, at least one reactance device 130 or 140 is connected to ports which are not connected to the resonant unit 120 among the ports of the rotary encoder 110. The at least one reactance device 130 or 140 has a different capacitance. In various embodiments of the present disclosure, it is assumed that a first reactance device and a second reactance device are connected to the port 2 and the port 3 of the rotary encoder 110, respectively.

As described above, in the rotary encoder 110, at least one port is electrically connected to the other port according to rotation. Accordingly, at least one of the reactance devices 130 or 140 connected to at least one port is electrically connected to the resonant unit 120 according to rotation of the rotary encoder 110. In this embodiment of the present disclosure, the first reactance device 130 may be connected to the resonant unit 120 according to a rotation state of the rotary encoder 110. In this case, if the rotary encoder 110 is rotated, both of the first reactance device 130 and the second reactance device 140 may be connected to the resonant unit 120. If the rotary encoder 110 is rotated again, connection between the first reactance device 130 and the resonant unit 120 is blocked, and the second reactance device 140 may be connected to the resonant unit 120. In this case, a sequence of connection of the reactance device with the resonant device 120 may be changed according to a rotation direction of the rotary encoder 110.

Since the first reactance device 130 and the second reactance 140 have different capacitances, if a reactance device connected to an inductor 122 of the resonant unit 120 is changed according to rotation of the rotary encoder 110, a device value of the LC circuit varies so that a resonant frequency of the wheel circuit 100 is changed.

The LC circuit configured with the inductor 122 of the resonant unit 120 and at least one reactance device connected to the inductor 122 has a resonant frequency according to an inductance of the inductor 122 and an equivalent capacitance of at least one reactance device. In this case, the resonant frequency may be expressed by a following Equation 1.

$$f = \frac{1}{\sqrt{LC}} \quad \text{Equation 1}$$

Referring to Equation 1, f is a resonant frequency of the LC circuit, L is inductance of the inductor 122 of the resonant unit 120, and C is an equivalent capacitance for at least one reactance device connected to the resonant unit 120.

If the rotary encoder 110 is rotated, as the reactance device connected to the resonant unit 120 varies, the equivalent capacitance of the LC circuit varies. Accordingly, the resonant frequency of the LC circuit is changed. Further, since the sequence of the reactance device connected to the resonant unit 120 may be changed according to a rotation direction of the rotary encoder 110, the sequence of change of the resonant frequency may be determined.

In this embodiment of the present disclosure, it is assumed that a resonant frequency of the LC circuit is F1 when the first reactance device 130 is connected to the resonant unit 120, a resonant frequency of the LC circuit is F2 when the second reactance device 140 is connected to the resonant unit 120, and a resonant frequency of the LC circuit is F3 when both of the first reactance device 130 and the second reactance device 140 are connected to the resonant unit 120.

Figure 4:
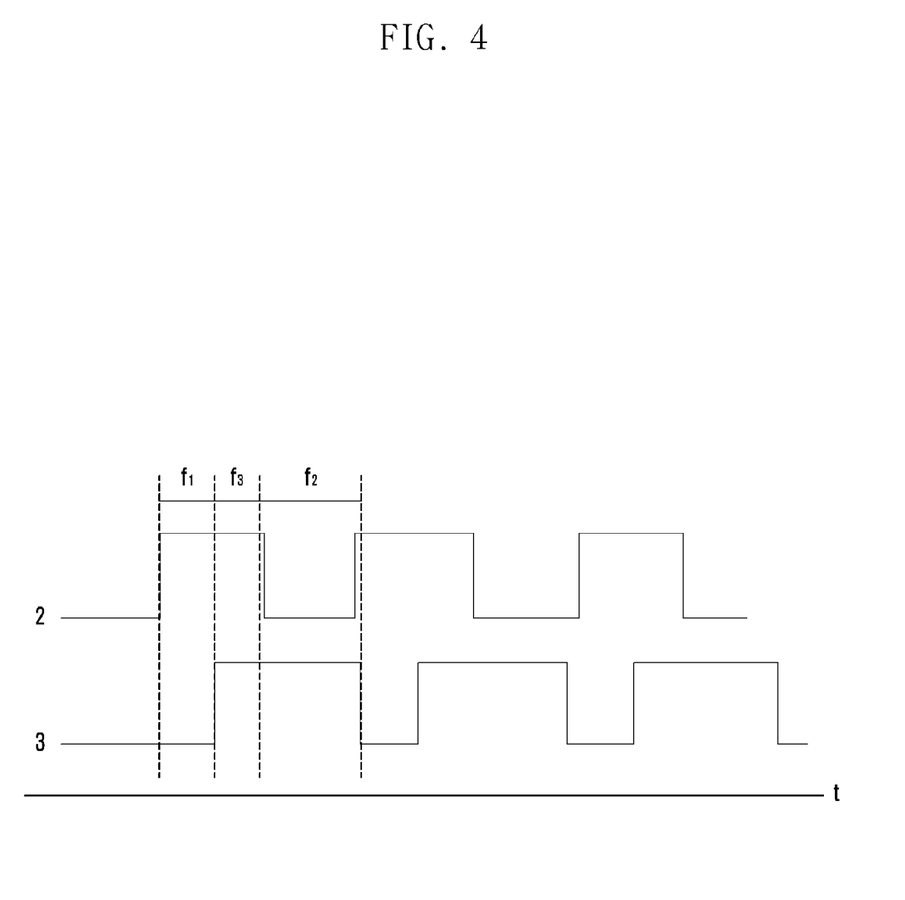
FIGS. 4 and 5 are diagrams illustrating a connection state between a port 2 and a port 1 and a connection state between a port 3 and the port 1 according to rotation of a rotary encoder in a wheel circuit according to an embodiment of the present disclosure.
Figure 5:
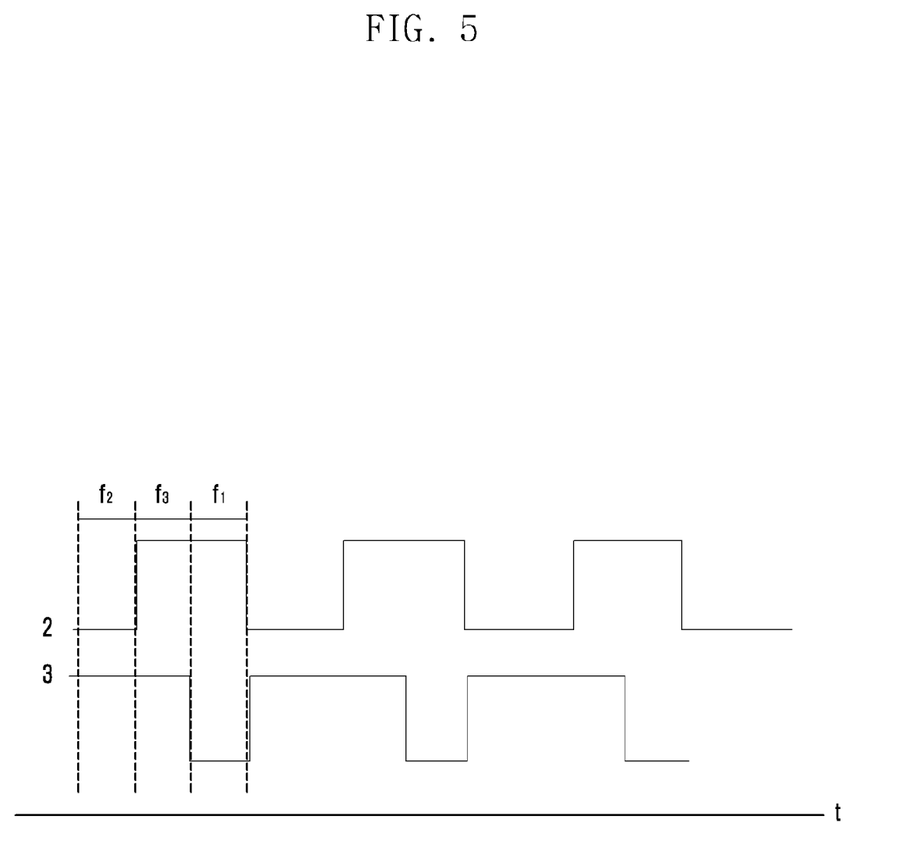

FIGS. 4 and 5 are diagrams illustrating a connection state between a port 2 and a port 1 and a connection state between a port 3 and the port 1 according to rotation of a rotary encoder in a wheel circuit according to an embodiment of the present disclosure.

Referring to FIG. 4, it illustrates variation in the resonant frequency when the rotary encoder 110 is rotated clockwise. First, when only the first reactance device 130 is connected to the resonant unit 120, the port 2 and the port 1 of the rotary encoder 110 connected to the first reactance device 130 are connected to each other. In contrast, the port 3 of the rotary encoder 110 connected to the second reactance device 140 is open, and connection of the port 3 with the port 1 is blocked. In this case, the resonant frequency of the LC circuit including the first reactance device 130 and the resonant unit 120 is F1.

If the rotary encoder 110 is rotated clockwise so that the first reactance device 130 and the second reactance device 140 are connected to the resonant unit 120 in parallel, both of the port 2 and the port 3 of the rotary encoder 110 are connected to the port 1 of the rotary encoder 110. In this case, the resonant frequency of the LC circuit including the first reactance device 130, the second reactance device 140, and the resonant unit 120 is F3.

If the rotary encoder 110 is rotated again clockwise so that only the second reactance device 140 is connected to the resonant unit 120, the port 3 of the rotary encoder 110 is connected to the port 1 of the rotary encoder 110. In contrast, the port 2 of the rotary encoder 110 connected to the first reactance device 130 is open, and connection of the port 2 with the port 1 is blocked. In this case, the resonant frequency of the LC circuit including the second reactance device 140 and the resonant unit 120 is F2.

As the rotary encoder is continuously rotated clockwise, the resonant frequency of the LC circuit varies in order of F1-F3-F2.

Referring to FIG. 5, when the rotary encoder 110 is rotated counterclockwise, the resonant frequency of the LC circuit varies in order of F2-F3-F1.

If AC current is applied to a digitizer or an EMR pad as an input panel, the digitizer may form an electromagnetic field. If the user moves an electronic pen close to the digitizer, a secondary current may be formed in a coil configuring the resonant circuit of the electronic pen. If the secondary current is formed by the coil, the electronic pen may form a secondary electromagnetic field through the resonant circuit. In this case, since the electronic pen forms the electromagnetic field through the resonant circuit, if the user moves the electronic pen which frequency-selectively formed a secondary electromagnetic field close to the electronic device, the digitizer may detect a moving track of the electronic pen.

Figure 6:
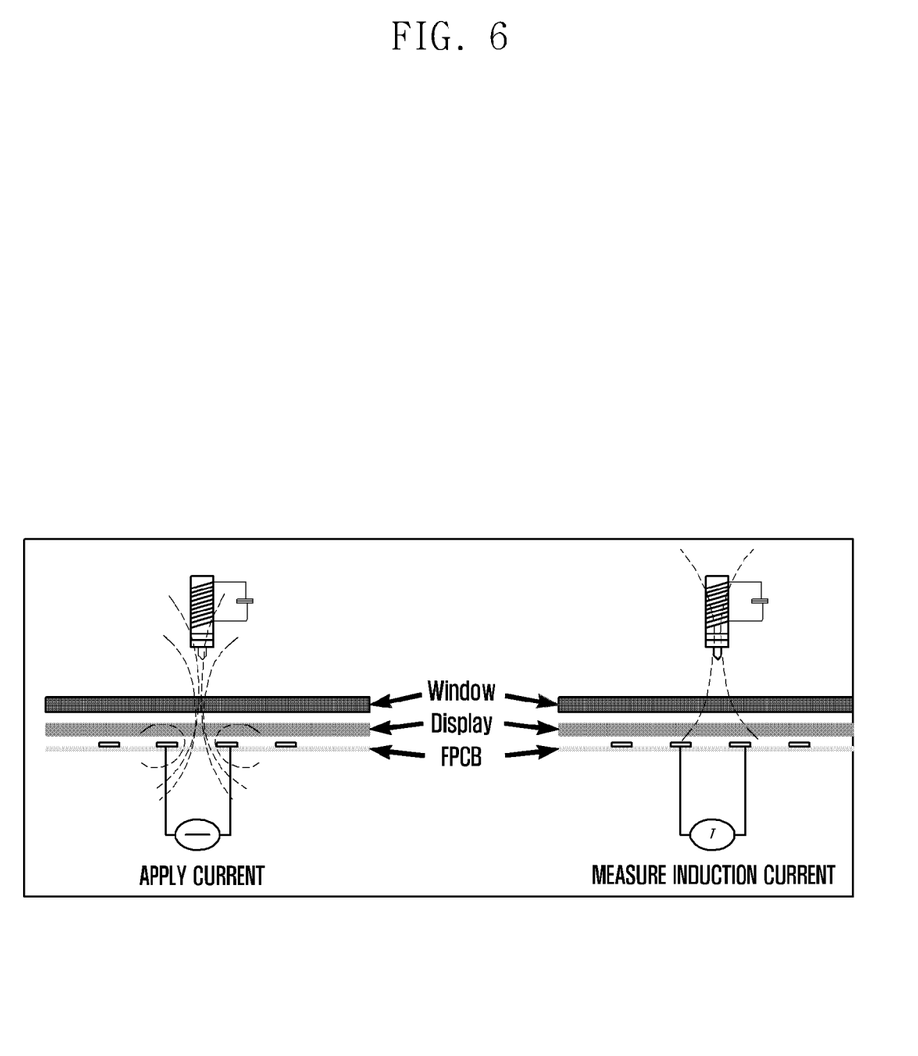
FIG. 6 is a diagram illustrating detecting variation of an electromagnetic field due to an electronic pen by a digitizer according to an embodiment of the present disclosure.

FIG. 6 is a diagram illustrating detecting variation of an electromagnetic field due to an electronic pen by a digitizer according to an embodiment of the present disclosure.

Referring to FIG. 6, an Electro Magnetic (EM) field is generated in the digitizer of the electronic device. The generated EM field is received by the resonant circuit of the electronic device to generate a current in the resonant circuit. In this case, since a circuit included in the electronic pen is a resonant circuit, a current is frequency-selectively generated. A secondary electromagnetic field is generated around the electronic pen due to the current generated in the electronic pen. In this case, the digitizer included in the electronic device may scan the secondary electromagnetic field to determine a location and a coordinate of the electronic device based on a strength of the electromagnetic field.

Figure 7:
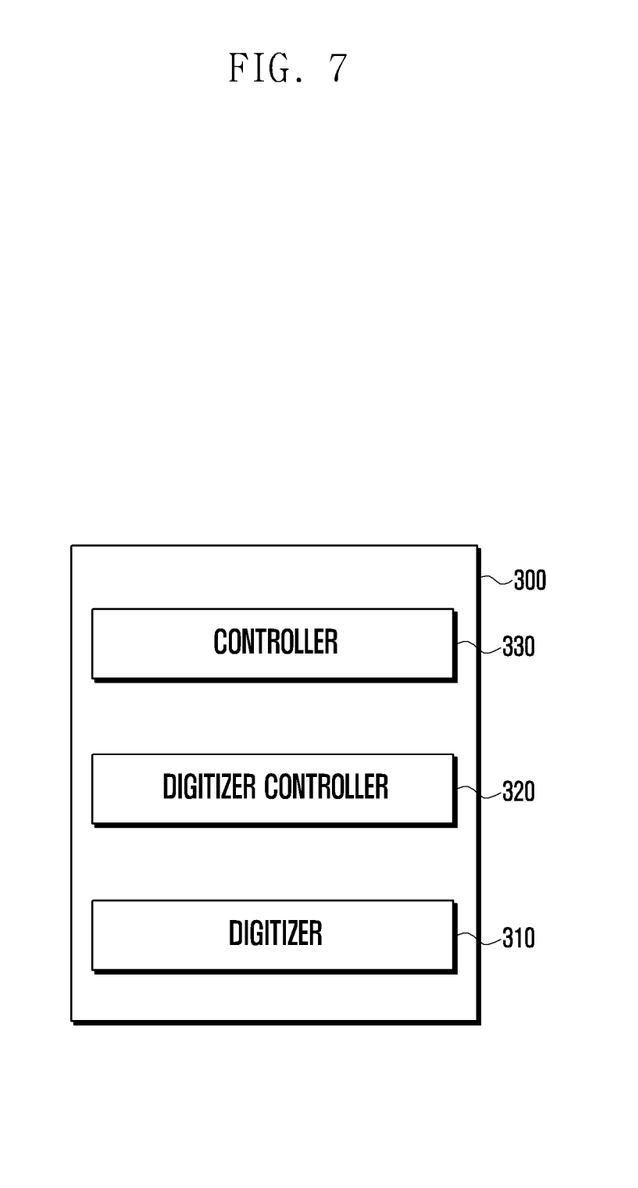
FIG. 7 is a block diagram illustrating a configuration of an electronic device including a digitizer according to an embodiment of the present disclosure.

FIG. 7 is a block diagram illustrating a configuration of an electronic device including a digitizer according to an embodiment of the present disclosure.

Referring to FIG. 7, an electronic device 300 includes a digitizer 310, a digitizer controller 320, and a controller 330. The digitizer 310 forms an EM field around. The digitizer controller 320 detects variation in a frequency of the secondary electromagnetic field by the electronic pen to transfer a detection result to the controller 330. The controller 330 controls various operations of the electronic device 300 based on the detection result. As a result, when the electronic pen is used, the electronic device 300 may detect an operation state of the rotary encoder 110.

In various embodiments of the present disclosure, the rotary encoder 110 may be implemented in such a manner that at least one of the reactance devices 130 or 140 is connected to the resonant unit 120 while the rotary encoder 110 is rotated, and connection is not blocked while the rotary encoder 110 is rotated.

For example, the rotary encoder 110 in the wheel circuit 100 of FIG. 3 may be implemented in such a manner that at least one of the first reactance device 130 or the second reactance device 140 is connected to the resonant unit 120 while the rotary encoder 110 is rotated, and connection of the first reactance device 130 and the second reactance device 140 with the resonant unit 120 is not blocked due to the rotation.

Figure 8:
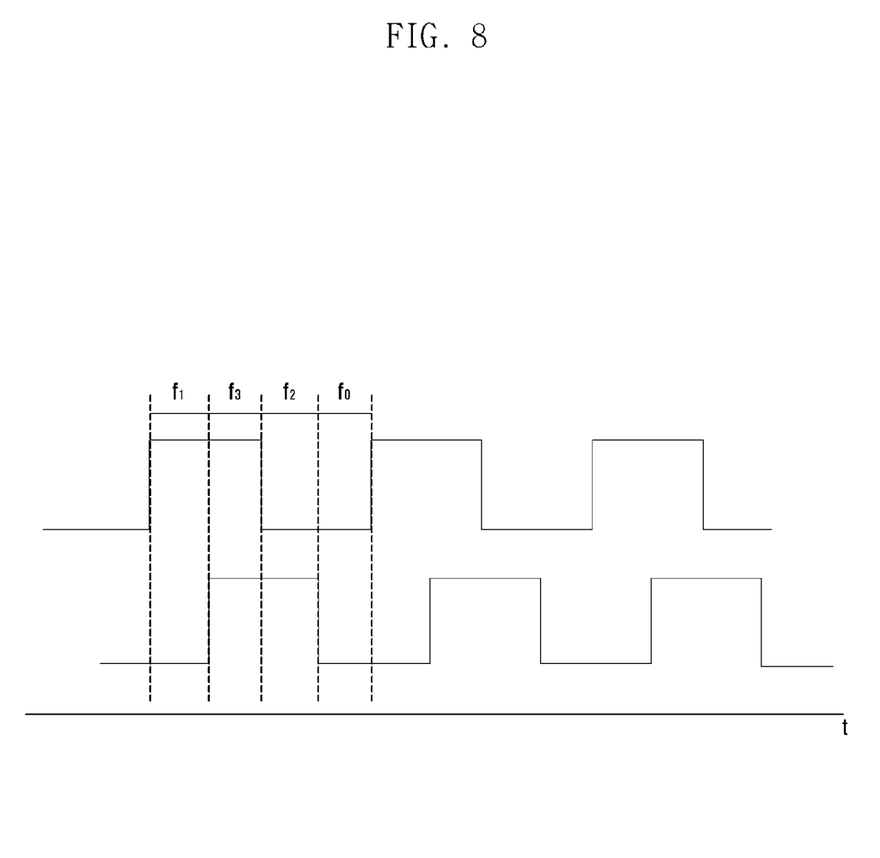
FIGS. 8 and 9 are diagrams illustrating a connection state between a port 2 and a port 1 and a connection state between a port 3 and a port 1 according to rotation of a rotary encoder in a wheel circuit according to an embodiment of the present disclosure.
Figure 9:
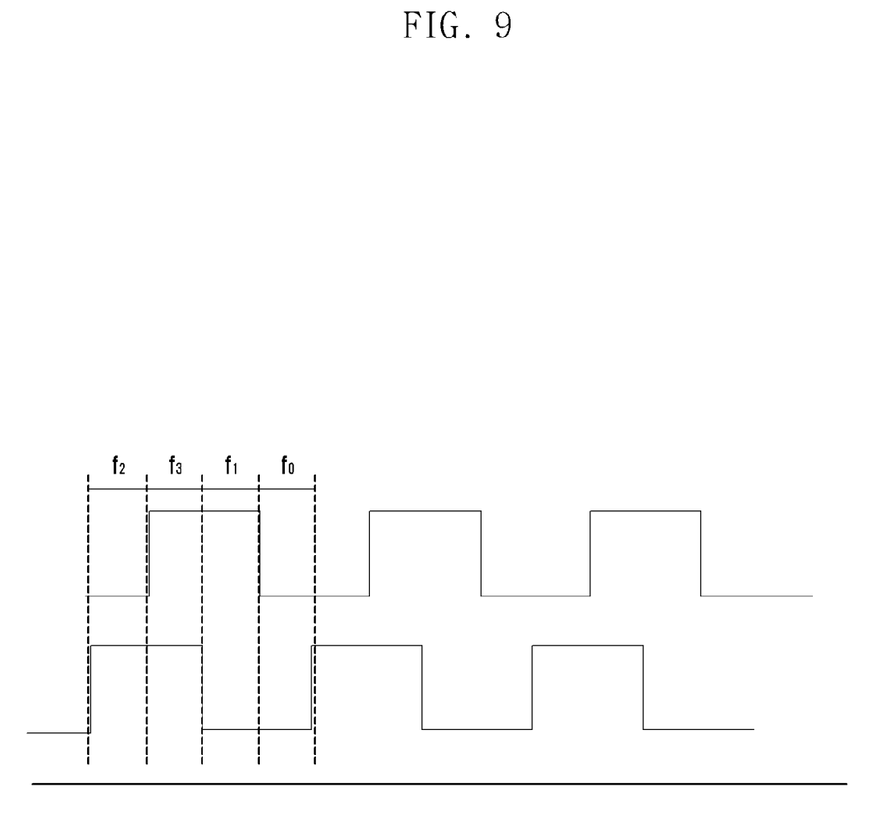

FIGS. 8 and 9 are diagrams illustrating a connection state between a port 2 and a port 1 and a connection state between a port 3 and a port 1 according to rotation of a rotary encoder in a wheel circuit according to an embodiment of the present disclosure.

As described above, it is assumed that the resonant frequency of the LC circuit is F1 when the first reactance device 130 is connected to the resonant unit 120, the resonant frequency of the LC circuit is F2 when the second reactance device 140 is connected to the resonant unit 120, and the resonant frequency of the LC circuit is F3 when both of the first reactance device 130 and the second reactance device 140 are connected to the resonant unit 120.

Referring to FIGS. 8 and 9, if both of the first reactance device 130 and the second reactance device 140 are not connected to the resonant unit 120 due to rotation of the rotary encoder 110, in this case, as shown in FIGS. 8 and 9, the resonant frequency of the LC circuit is F0.

In this case, in view of the electronic device detecting an operation state of a wheel by an electromagnetic induction phenomenon due to variation in a resonant frequency, since electromagnetic induction due to all of four resonant frequencies from F0 to F3 should be detected, efficiency is deteriorated.

Accordingly, the rotary encoder 110 may be implemented in such a manner that connection of the first reactance device 130 and the second reactance device 140 with the resonant unit 120 is not blocked during rotation. In this case, the value of the resonant frequency F0 may be used for other applications.

A method of implementing the rotary encoder 110 is not specially limited. In various embodiments of the present disclosure, in order to control the electronic device by a wheel using four resonant frequencies, the above implementing method may not be used.

According to various embodiments of the present disclosure, the wheel circuit 100 may further include a switch 150. For example, as shown in FIG. 3, one terminal of the switch 150 may be connected to the resonant unit 120 and another terminal of the switch 150 may be connected to the rotary encoder 110. On/off of the switch 150 may be controlled according to operation of the user, and the switch 150 may be coupled with a button for a user operation.

The switch 150 short-circuits the circuit in an off state. Accordingly, when the switch 150 is turned-off, the wheel circuit 100 performs an operation according to wheel control (i.e., control of the rotary encoder) of user.

Conversely, the switch 150 turns-off the circuit in an on state. Accordingly, when the switch 150 is turned-on, since a circuit between the rotary encoder 110 and the resonant unit 120 is open, the LC circuit is configured by only the resonant unit 120. In this case, the resonant frequency is F0. Accordingly, a neighboring electronic device may detect that the switch 150 is controlled to be an on state due to an electromagnetic induction phenomenon by a resonant frequency F0.

The circuit shown in FIG. 3 is for illustrative purpose only to describe a base idea of the present disclosure. It should be understood that that simple modification of the circuit, addition and removal of a device are included in a range of the present disclosure falling within the spirit and scope of the present disclosure.

Hereinafter, an electronic pen 200 including the above wheel circuit 100 will be described.

Figure 10:
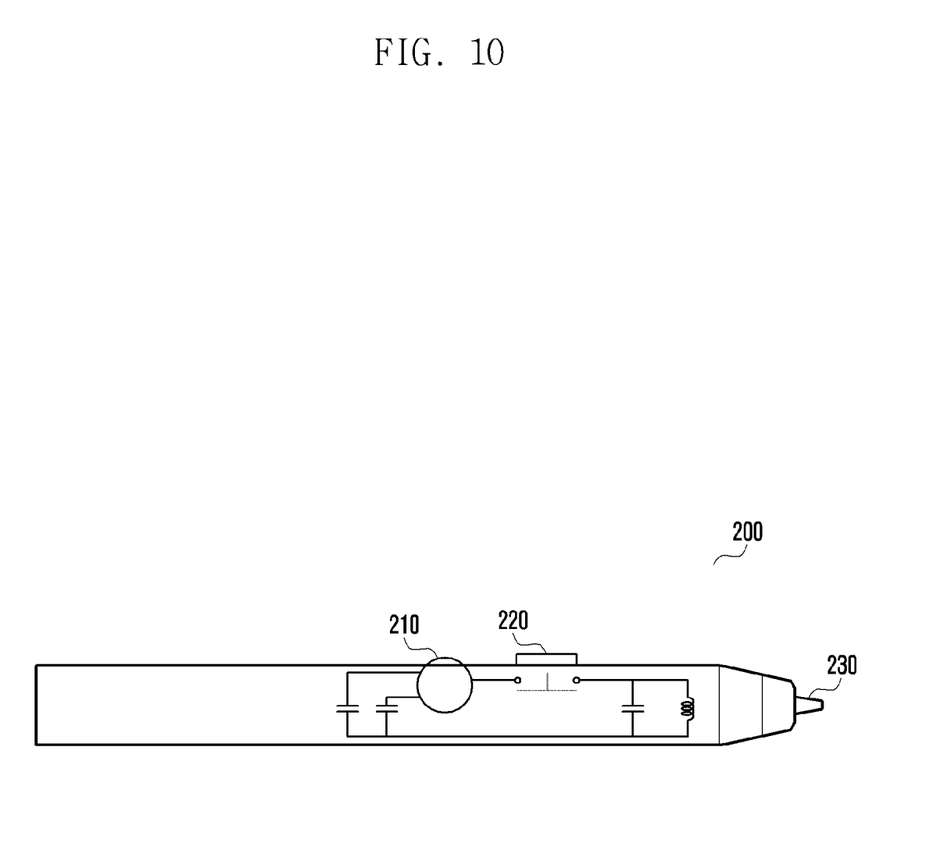
FIG. 10 is a diagram illustrating an electronic pen including a wheel circuit according to an embodiment of the present disclosure.

FIG. 10 is a diagram illustrating an electronic pen including a wheel circuit according to an embodiment of the present disclosure.

Referring to FIG. 10, the electronic pen 200 including the wheel circuit 100 may include a wheel 210. The wheel 210 may be configured with a rotatable handle or jog dial exposed to the exterior so that the user may perform a rotation operation.

The wheel 210 may be coupled with the wheel circuit 100 shown in FIG. 3. In this case, a handle exposed to the exterior may be a part of the rotary encoder 110. The rotary encoder 110 exposed to the exterior is rotated by an operation of the user, and as the rotary encoder 110 is rotated, a resonant frequency of the wheel circuit 100 varies. The variation in the resonant frequency generates an electromagnetic induction phenomenon for a neighboring electronic device.

If the electronic pen 200 generates the variation in the resonant frequency by controlling the wheel 210 in an electromagnetic field of the electronic device forming the electromagnetic field, the electronic device may detect proximity of the electronic pen 200 and an operation state of the wheel 210 according to the electromagnetic induction phenomenon.

The electronic pen 200 may include a button unit 220. The button unit 220 may be configured with a button exposed to the exterior so that the user may perform a push operation and a switch.

The button unit 220 may be coupled with the wheel circuit 100 shown in FIG. 3. In this case, the button exposed to the exterior may be coupled with a switch 150 of the wheel circuit 100. As the button exposed to the exterior is pushed/pulled by an operation of the user, on/off of the switch 150 is controlled.

Referring to FIG. 10, if the button unit 220 is pushed, the switch 150 of the wheel circuit 100 is controlled to be an off state. If the button unit 220 is pulled, the switch 150 of the wheel circuit 100 is controlled to be an on state. According to the implementation type, the on/off operation based on push/pull may be conversely set. If the switch 150 is turned-on/off according to an operation of the button unit 220, the resonant frequency of the wheel circuit 100 varies. The variation in the resonant frequency generates the electromagnetic induction phenomenon for a neighboring electronic device. Accordingly, the electronic device may detect an operation state of the button unit 200 of the electronic pen 200.

According to various embodiments of the present disclosure, the electronic pen 200 may include a pen tip 230. The pen tip 230 may be pushed by an external force. For example, when the user applies a force in a direction the electronic device in a state in which the pen tip 230 of the electronic pen 200 is in contact with the electronic device, the pen tip 230 is pushed. The pen tip 230 may include a pressure sensor to detect push of the pen tip 230, and may be configured by devices which vary the resonant frequency of an internal circuit of the electronic pen 200 as the pen tip 230 is pushed.

According to various embodiments of the present disclosure, a variation amount of the resonant frequency due to rotation of the rotary encoder 110 is implemented to be greater than a variation amount of the resonant frequency by the pen tip 230. Such implementation is to prevent a detection error when the electronic device detects a pressure applied to the pen tip 230 and a rotation state of the wheel 210.

This may be expressed by Equation 2.

$$|F_1 - F_2| > F_{delta\,Press}$$

$$|F_2 - F_3| > F_{delta\,Press} \qquad \text{Equation 2}$$

A wheel circuit using electromagnetic induction and an electronic pen including the same can control an electronic device according to an operation of a wheel by using electromagnetic induction without adding an annexed configuration to supply power.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wheel circuit using electromagnetic induction, the wheel circuit comprising:
    a rotary encoder configured to be rotated according to a user operation and includes at least two ports;
    a resonant circuit configured to be coupled with a port of the at least two ports; and
    at least two capacitors, each capacitor including one end which is coupled with at least one other port which is not coupled with the resonant circuit among the at least two ports,
    wherein the at least two capacitors have a capacitance different from each other,
    wherein the at least two capacitors comprise a first capacitor connected to a first port of the rotary encoder and a second capacitor connected to a second port of the rotary encoder, and
    wherein at least one capacitor of the at least two capacitors is connected to the resonant circuit according to rotation of the rotary encoder to vary a resonant frequency.

2. The wheel circuit of claim 1, wherein the resonant frequency varies according to capacitance of a capacitor connected to the resonant circuit, so that at least one electronic device detects an operation state of a wheel due to electromagnetic induction by the variation of the resonant frequency.

3. The wheel circuit of claim 1,
    wherein the resonant frequency is changed to a first resonant frequency when the first capacitor is connected to the resonant circuit, the resonant frequency is changed to a second resonant frequency when the second capacitor is connected to the resonant circuit, and the resonant frequency is changed to a third resonant frequency when both of the first capacitor and the second capacitor are connected to the resonant circuit.

4. The wheel circuit of claim 1, wherein the resonant frequency is sequentially changed in a rotation direction of the rotary encoder.

5. The wheel circuit of claim 1, wherein the resonant circuit comprises at least one of an inductor or a capacitor.

6. The wheel circuit of claim 1, further comprising a switch having one end connected to the resonant circuit and the other end connected to the rotary encoder.

7. The wheel circuit of claim 6, wherein the switch is turned-on/off to vary the resonant frequency.

8. The wheel circuit of claim 1, wherein the rotary switch is implemented not to block connection of the at least one capacitor of the at least two capacitors with the resonant circuit while the rotary switch is rotated.

9. An electronic pen comprising a wheel circuit using electromagnetic induction, the electronic pen comprising:
a rotary encoder configured to be rotated according to a user operation and includes at least two ports;
a resonant circuit configured to be coupled with a port of the at least two ports; and
at least two capacitors, each capacitor including one end which is coupled with at least one other port which is not coupled with the resonant circuit among the at least two ports,
wherein the at least two capacitors have a capacitance different from each other,
wherein the at least two capacitors comprise a first capacitor connected to a first port of the rotary encoder and a second capacitor connected to a second port of the rotary encoder, and
wherein at least one capacitor of the at least two capacitors is connected to the resonant circuit according to rotation of the rotary encoder to vary a resonant frequency.

10. The electronic pen of claim 9, wherein the resonant frequency varies according to capacitance of a capacitor connected to the resonant circuit, so that at least one electronic device detects an operation state of a wheel due to electromagnetic induction by the variation of the resonant frequency.

11. The electronic pen of claim 9,
wherein the resonant frequency is changed to a first resonant frequency when the first capacitor is connected to the resonant circuit, the resonant frequency is changed to a second resonant frequency when the second capacitor is connected to the resonant circuit, and the resonant frequency is changed to a third resonant frequency when both of the first capacitor and the second capacitor are connected to the resonant circuit.

12. The electronic pen of claim 9, wherein the resonant frequency is sequentially changed in a rotation direction of the rotary encoder.

13. The electronic pen of claim 9, wherein the resonant circuit comprises at least one of an inductor or a capacitor.

14. The electronic pen of claim 9, further comprising a switch having one end connected to the resonant circuit and the other end connected to the rotary encoder.

15. The electronic pen of claim 14, wherein the switch is turned-on/off according to a user operation, and is turned-on/off to vary the resonant frequency.

16. The electronic pen of claim 9, wherein the rotary switch is implemented not to block connection of the at least one capacitor of the at least two capacitors with the resonant circuit while the rotary switch is rotated.

17. The electronic pen of claim 9, further comprising:
a pen tip provided at one end of the electronic pen to vary the resonant frequency according to a strength of an external force,
wherein a variation amount of resonant frequency due to rotation of the rotary switch is greater than a variation amount of resonant frequency by the pen tip.

18. A circuit comprising:
a first switch configured to be equipped with a plurality of ports, and change a connection between ports by movement of an input device;
at least one resonant circuit configured to be connected to the plurality of ports; and
at least one reactance device configured to be connected to the plurality of ports,
wherein, in the first switch, a connection sequence of the at least one reactance device with the at least one resonant circuit is changed according to a moving direction of the input device.

19. The circuit of claim 18, wherein, in the first switch, a connection speed between the at least one reactance device and the at least one resonant circuit is changed according to a moving speed of the input device.

20. The circuit of claim 18, wherein the first switch comprises a rotary encoder, and the at least one reactance device comprises a capacitor.

21. The circuit of claim 18, further comprising a second switch having one end connected to the at least one resonant circuit and the other end connected to the first switch.

22. The circuit of claim 21, wherein the second switch is open when an electric input is received from an exterior, and is short-circuited when the electric input is not received from the exterior.

23. The circuit of claim 18, wherein the first switch is used so that a digitizer included in an electronic device detects a variation sequence and variation speed of a frequency of a secondary electromagnetic field generated by the first switch.

24. The circuit of claim 20,
wherein the rotary encoder is configured to be rotated according to a user operation and includes at least one port, and
wherein the capacitor is connected to the at least one resonant circuit according to rotation of the rotary encoder to vary a resonant frequency.

* * * * *